Jan. 16, 1934.  A. NOVICK  1,943,985
METHOD AND MACHINE FOR MAKING ENVELOPES OF THE OPEN END TYPE
Filed June 12, 1930  8 Sheets-Sheet 1
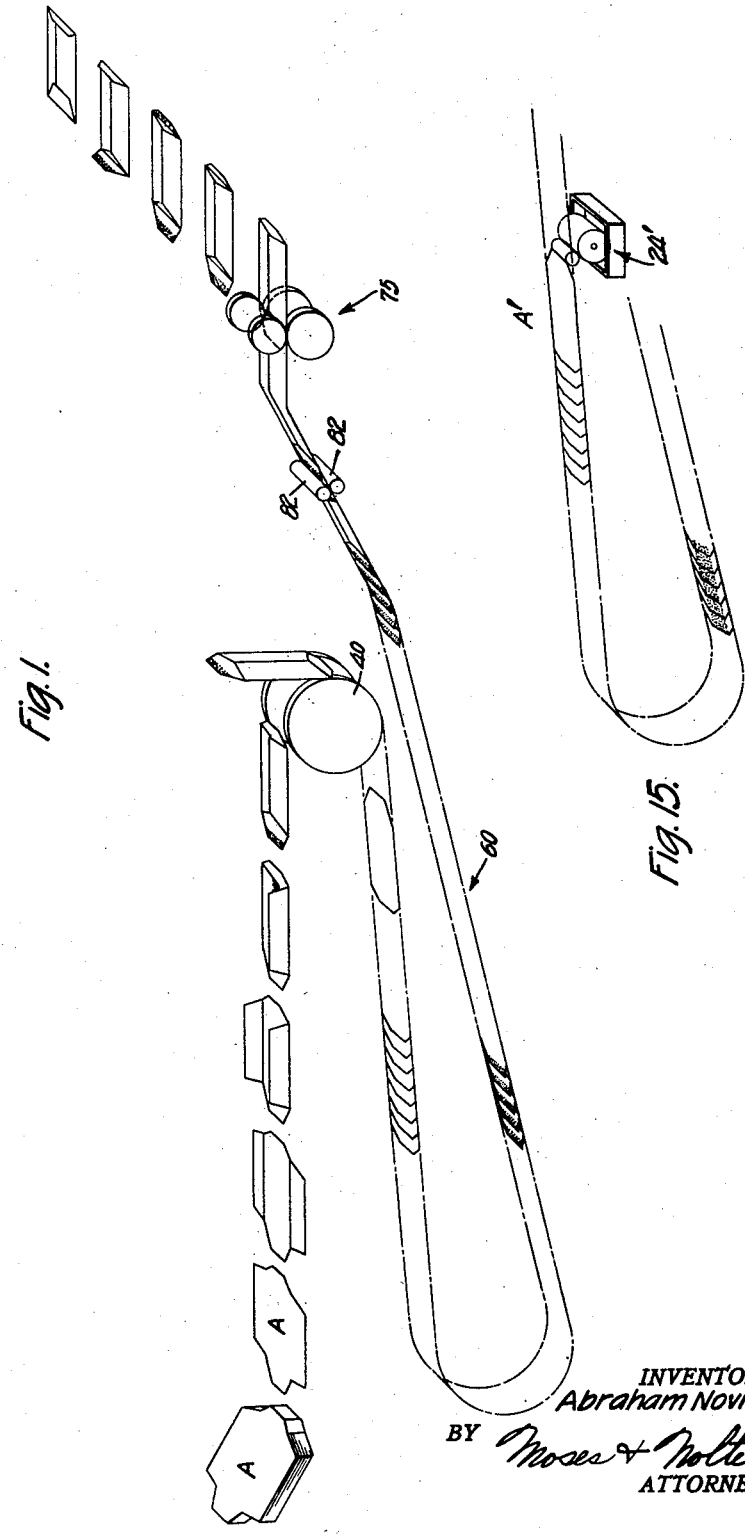
INVENTOR
Abraham Novick.
BY Moses & Nolte
ATTORNEYS

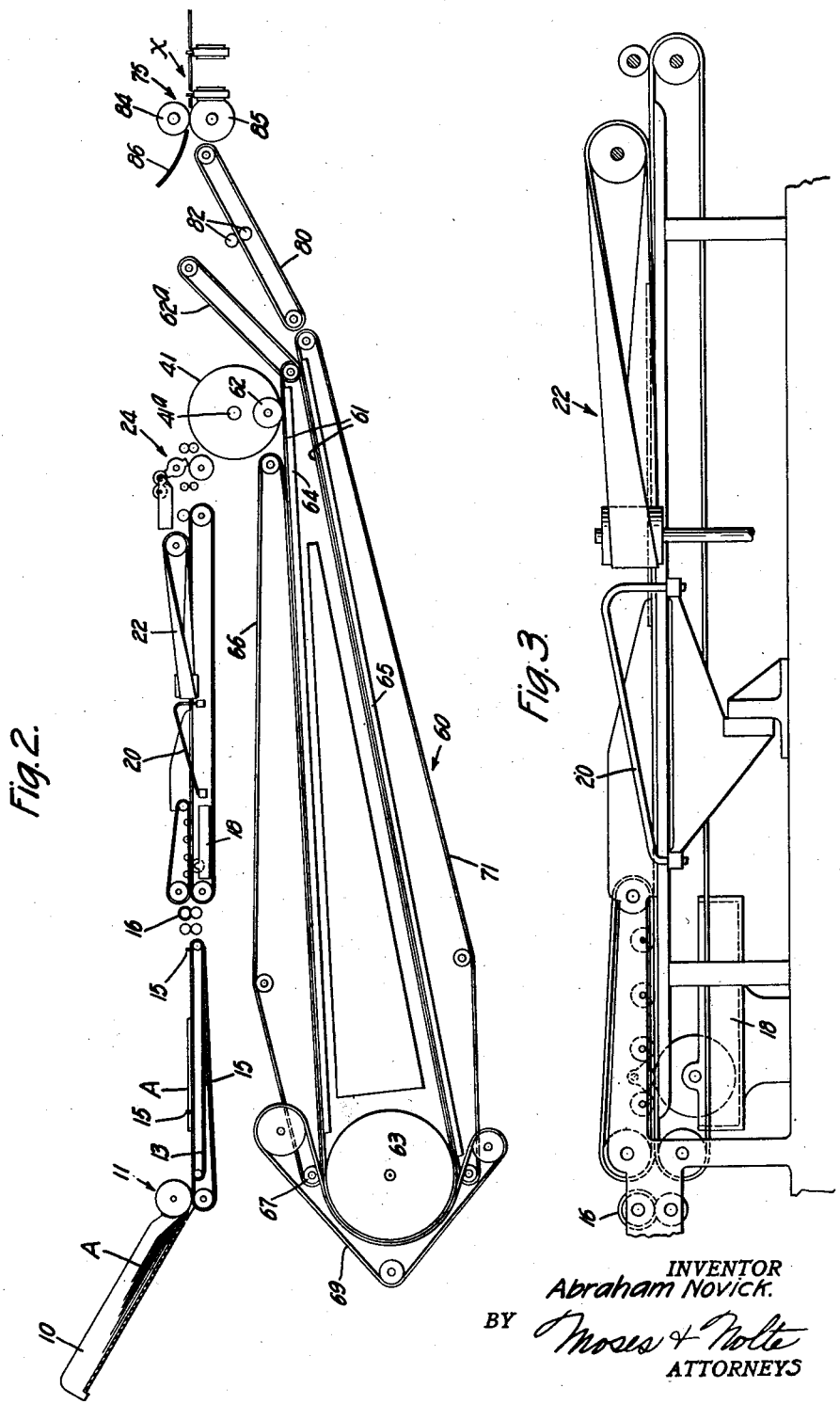

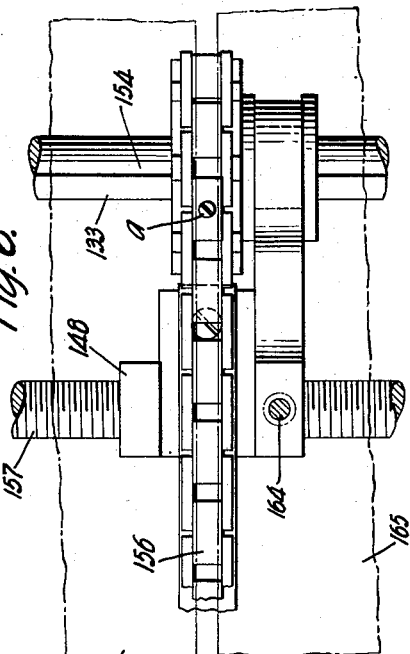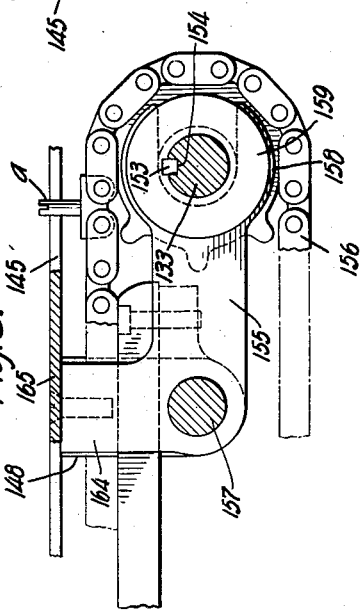

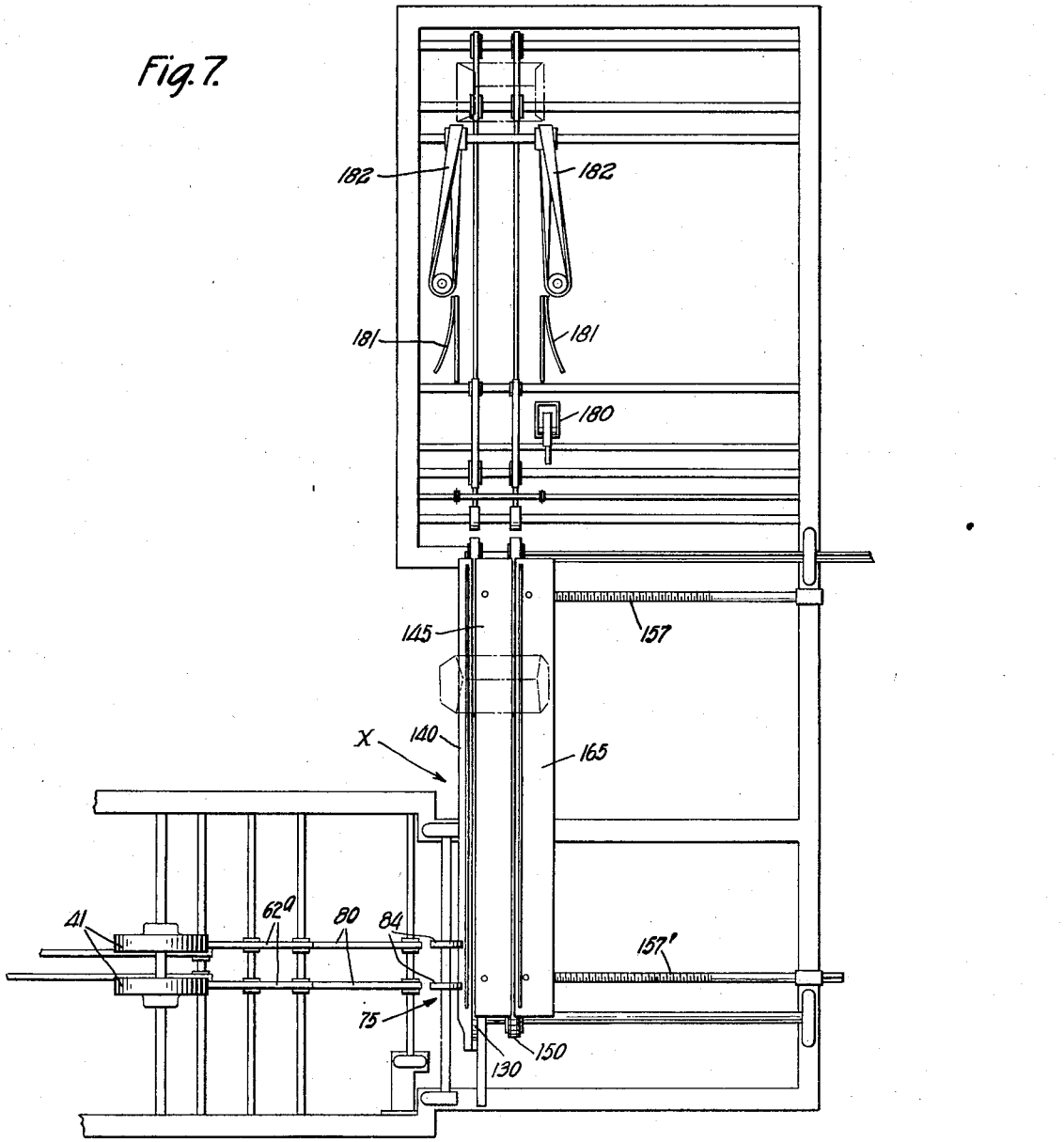

INVENTOR
Abraham Novick.
BY Moses & Nolte
ATTORNEYS

Jan. 16, 1934.   A. NOVICK   1,943,985
METHOD AND MACHINE FOR MAKING ENVELOPES OF THE OPEN END TYPE
Filed June 12, 1930   8 Sheets-Sheet 6
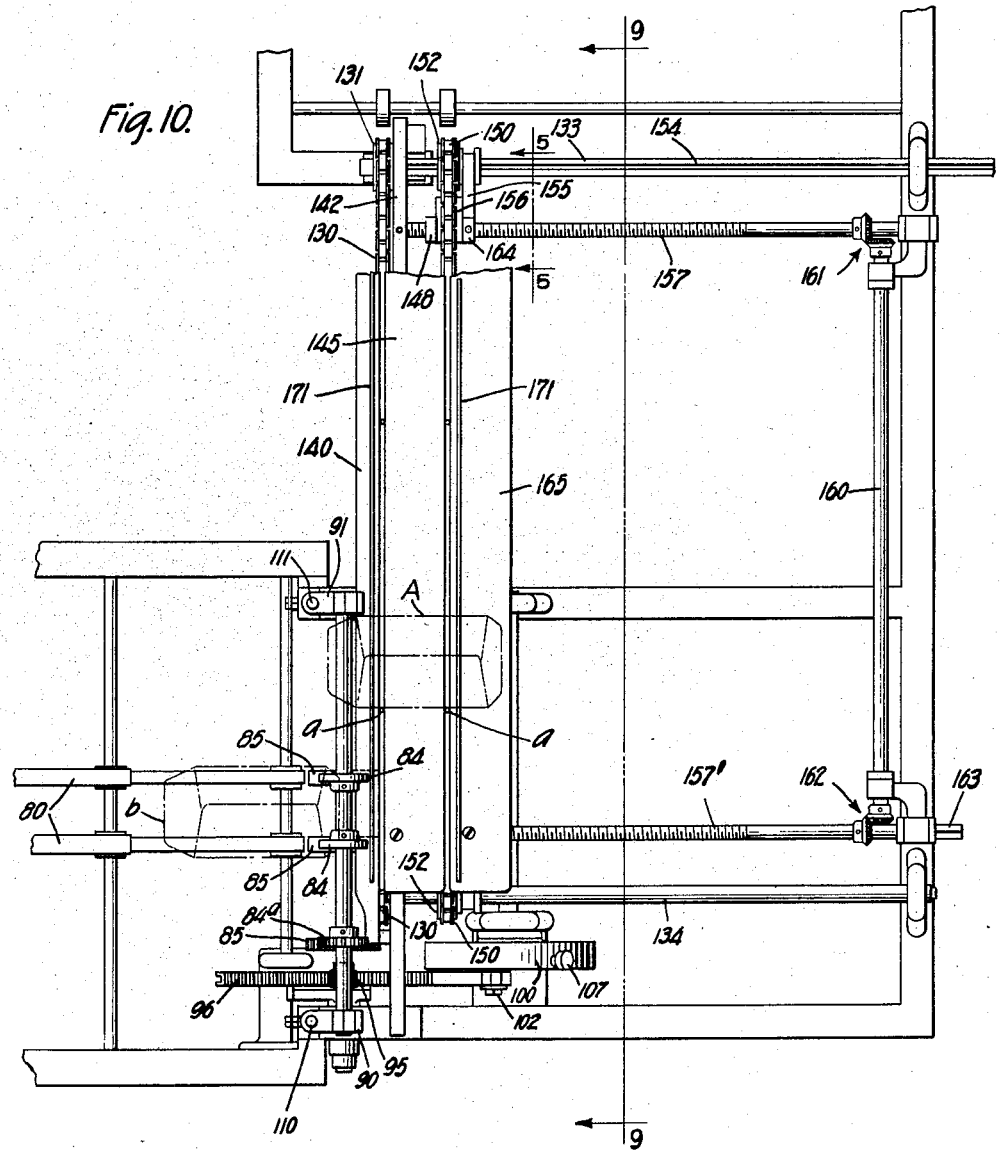
INVENTOR
Abraham Novick
BY
ATTORNEYS Jan. 16, 1934.  A. NOVICK  1,943,985
METHOD AND MACHINE FOR MAKING ENVELOPES OF THE OPEN END TYPE
Filed June 12, 1930  8 Sheets-Sheet 7
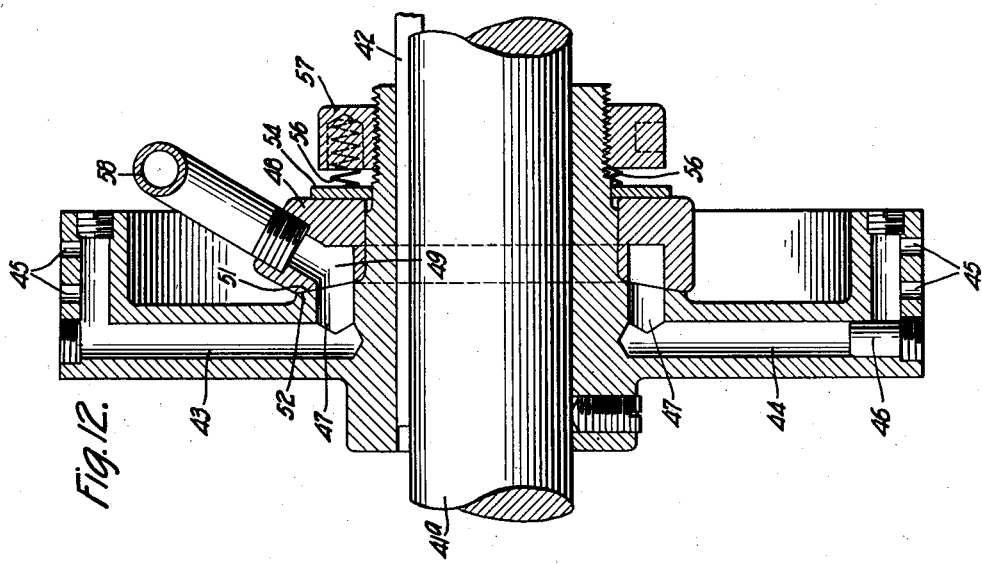
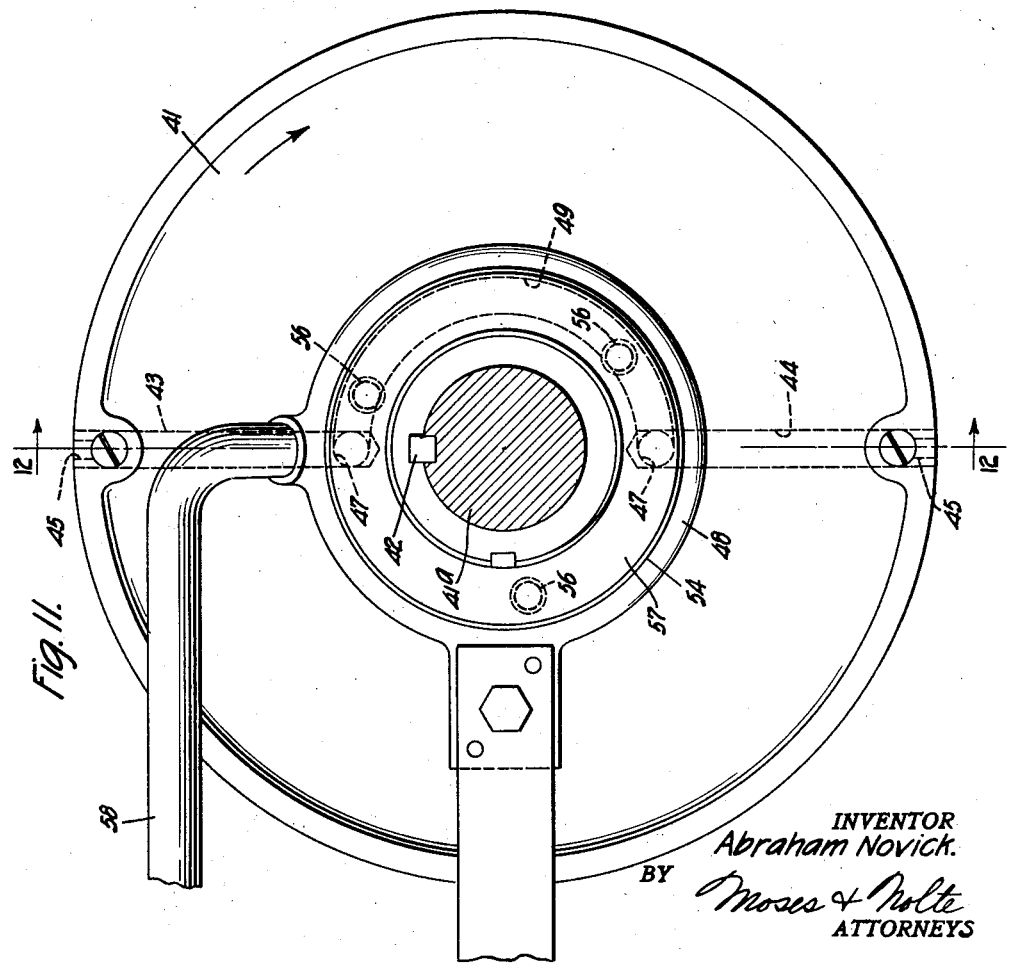
INVENTOR
Abraham Novick.
BY
Moses & Nolte
ATTORNEYS Jan. 16, 1934.  A. NOVICK  1,943,985
METHOD AND MACHINE FOR MAKING ENVELOPES OF THE OPEN END TYPE
Filed June 12, 1930  8 Sheets-Sheet 8
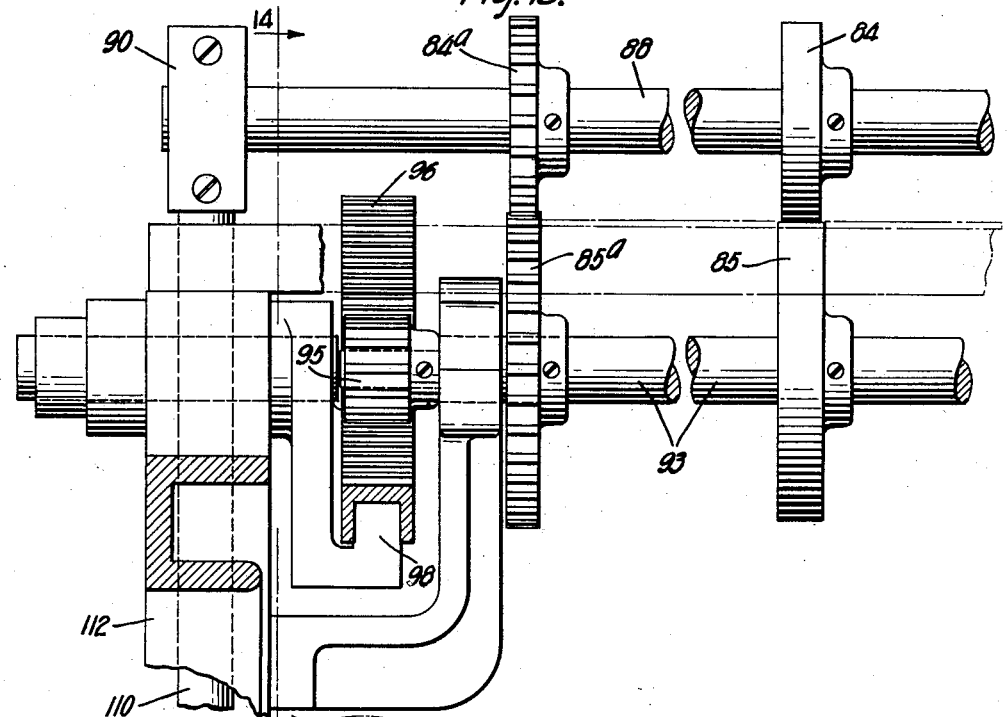
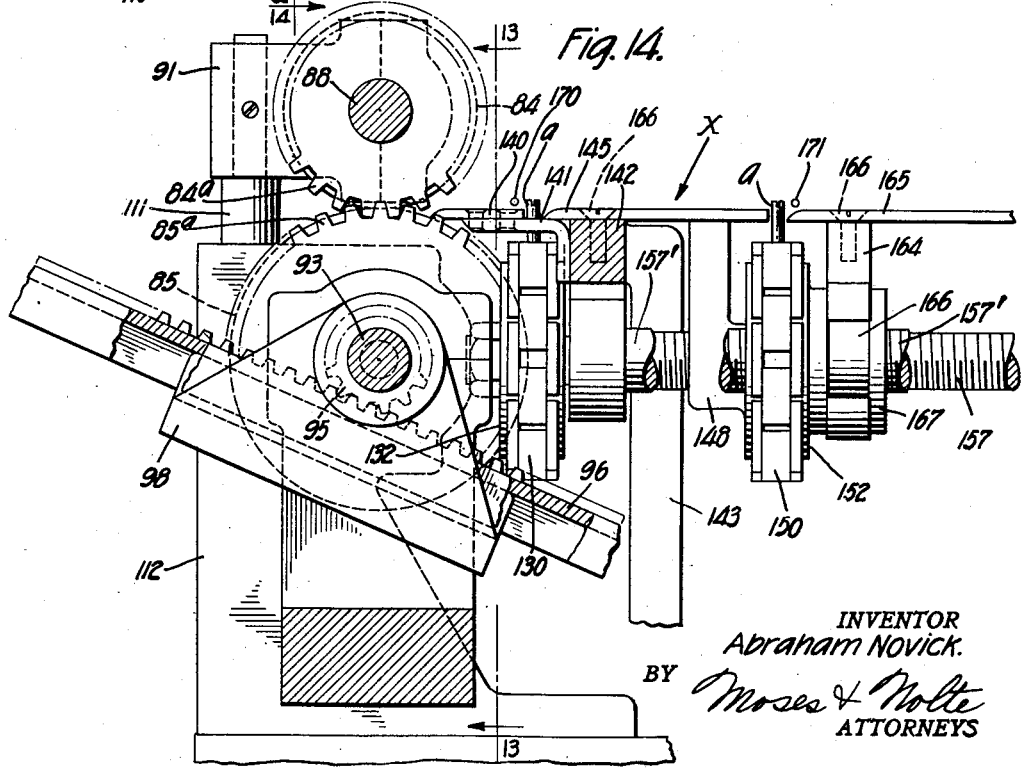
INVENTOR
Abraham Novick.
BY Moses & Nolte
ATTORNEYS Patented Jan. 16, 1934

1,943,985

UNITED STATES PATENT OFFICE 1,943,985

METHOD AND MACHINE FOR MAKING ENVELOPES OF THE OPEN END TYPE

Abraham Novick, Flushing, N. Y., assignor to F. L. Smithe Machine Co., Inc., New York, N. Y., a corporation of New York Application June 12, 1930. Serial No. 460,559

16 Claims. (Cl. 93—62)

My present invention relates in part to machines of the rotary type for making envelopes and has special reference to those machines designed to make envelopes of the open end type. This type of envelope is usually employed for the larger size and the handling of the large blanks required is often a matter of some difficulty. For this reason it has not been the practice to effect both the gumming and folding of the sealing flap in a single machine. The present invention accordingly has for an object the provision of a machine which will automatically and efficiently make finished envelopes from the blanks supplied thereto, which envelopes shall have a gummed and folded sealing flap.

While my invention in its broader aspects is not limited to this feature, I have found it advantageous to dispose (between certain of the folding means and specifically between means for folding the side flaps and those for folding the end flaps) the means for drying the gum applied to the sealing flaps. One reason for this is that by having folded the side flaps, for example, the blanks which are apt to be large are rendered easier to handle. I am also enabled to dispose the drier beneath the folding mechanism for the side flaps, thereby effecting a considerable economy of space.

In one type of envelope making machine to which my invention is particularly applicable, the blanks after having their side flaps folded are arrested in their travel and fed sidewise at right angles to their previous direction of movement. By virtue of this arrangement certain advantages are obtained as regards the folding operations since all the folding is done along lines parallel to the direction of travel. In such machine care must be taken that the blanks do not overreach their travel on the first conveyor, in which case they will not be in proper alignment on the second conveyor upon which they are deposited. The present invention accordingly provides improved means for arresting the travel of the blanks upon the first conveyor and depositing them upon the second conveyor, in a manner to insure a high degree of accuracy of alignment upon the second conveyor.

Further objects of my invention are: to provide improved means both for introducing the envelopes into the drier and for delivering them therefrom into the means completing the folding operations; to provide a machine of improved adjustability for various sizes of envelopes to be made; and, to provide an improved conveyor by which the envelopes are transported through the drier.

A further feature of the invention has to do with a novel method of envelope manufacture which comprises feeding the blanks from a stack with the side flap portions parallel to the direction of travel, gumming and folding the side flaps, then gumming and folding the sealing flap, drying the sealing flap, and then completing the folding operations.

Further objects of my invention and advantages thereof will be apparent as the description proceeds, reference being had to the accompanying drawings in which:

Figure 1 is a diagrammatic showing of the operations performed upon the envelope blanks;

Figure 2 is a view in side elevation of the flap folding means and of the drier;

Figure 3 is a view on a larger scale of certain of the gumming and folding means seen in Figure 2;

Figure 4 is a plan view of the machine as seen in Figure 2;

Figure 5 is a detail partly in sectional elevation of a driving sprocket and chain comprising a portion of the conveyor receiving the envelopes from the drying way and is a view taken along the line 5—5 of Figure 10;

Figure 6 is also a detail in plan showing means for driving said conveyor chain;

Figure 7 is a plan view of the right hand end of the machine;

Figure 10 is a plan view of that portion of the machine seen in Figures 8 and 9 but to a smaller scale;

Figure 11 is an enlarged detail of the means for collecting and delivering the envelopes to the drying way;

Figure 12 is a view taken along the line 12—12 of Figure 11;

Figure 13 is a detail of the means receiving the envelopes from the drying way and is a sectional view taken along line 13—13 of Figure 14;

Figure 14 is a view taken along the line 14—14 of Figure 13; and

Figure 15 is a diagrammatic view showing a modified sequence of operations in which the envelopes are collected into an overlapping band with the sealing flaps exposed and the gum applied in a continuous swath to such band.

Figure 8:
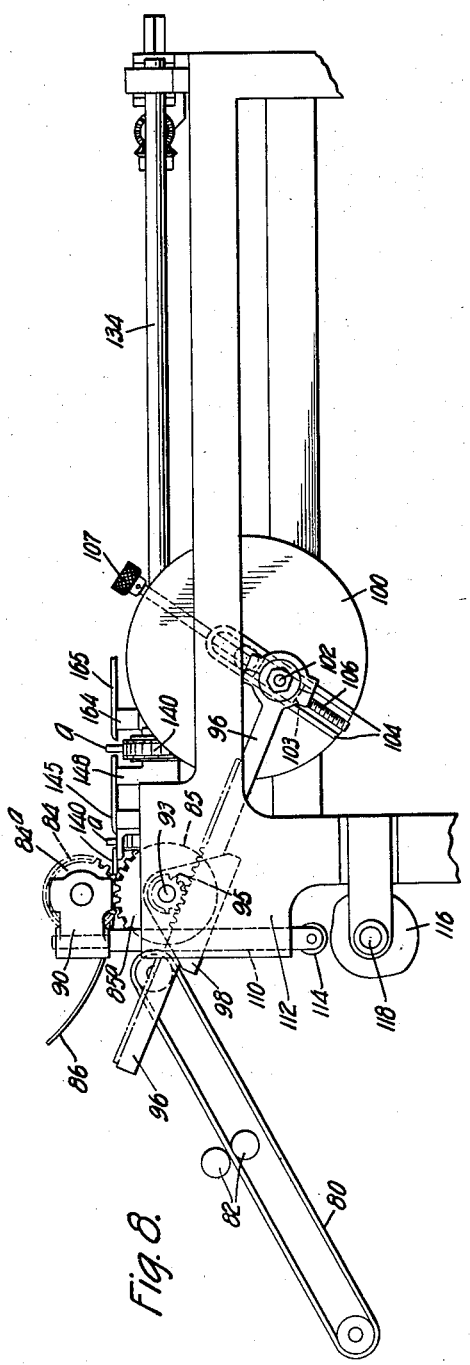
Figure 8 is a view in side elevation of the means for delivering the envelopes from the drying way.

Referring to the drawings in detail, and particularly to Figure 1, blanks A are fed from the stack shown by mechanism seen in the subsequent figures, are separately fed into the folding mechanism, the side flaps scored, one of the side flaps gummed and both folded, the sealing flap gummed, after which latter operation, the blanks arrive at the collecting device 40 by means of which they are disposed in overlapped relation and in such relation are caused to pass through a drying way, whereupon they arrive at a delivery mechanism denoted generally by 75, and are delivered to a secondary conveyor at right angles to their previous course of travel and during such subsequent travel have the remaining operations of gumming and sealing performed upon them. The arrangement of conveying the blanks parallel to the flaps, which are being folded, whereby they are caused to assume a right angle turn in their course, a step which per se is not new with the present applicant, facilitates the construction of the folding mechanism for these flaps.

Referring more particularly to Figure 2, 10 denotes a support for the stack of blanks which are fed therefrom by feeding mechanism 11 of known type, which per se forms no part of the present invention, onto a pair of endless chains or conveyors 13, 13, Figure 4, and belts 14, 14, chains 13 being provided at appropriate intervals with pins 15 which engage behind the blanks. After thus being separated by the conveying elements mentioned, the blanks are scored by rotary scoring blades 16, 16, Figures 2 and 4. The side flap a of the blank A has gum applied to the under surface thereof from the gum box 18, Figures 2 and 3, whereupon said side flaps are turned by means of the curved formers or so-called plow shares 20, 20 and curved belts 22, 22 which serve to fold the non-gummed side flap down upon the gummed surface of the other flap. The sealing flaps b of the envelopes are now gummed by means of the gumming mechanism 24 which preferably is of the stamping type.

The blanks in this stage of their development are now operated upon by a collecting and delivering mechanism 40 which is best seen in Figures 11 and 12. This mechanism, which is preferably pneumatically operated, comprises a pair of discs 41 each mounted upon rotatable shaft 41a by means of a spline 42; each disc 41 is provided with ducts 43, 44 communicating with the periphery of the disc through outlets 45, 45. In case long envelopes are being made, the duct 44 may not be needed, in which case the duct 44 is stopped by means of a plug 46. For the purpose of supplying suction to ducts 43, 44, a stationary collar 48 is provided having an open-hemi-spherical channel 49 adapted to register with the mouths 47 of ducts 43, 44. Collar 48 has a machined surface 51 which makes an air-tight contact with a similar surface 52 of the disc. For the purpose of insuring the air-tight fit of the surfaces 51 and 52, the collar 48 is urged against the disc by means of a ring 54 which is acted upon by springs 56 secured at intervals around a stationary collar 57. Collar 48 is connected with a source of suction by means of a pipe 58. It will be evident from the foregoing that when duct 43, for example, arrives at an upper vertical position, its mouth 47 will register with the semi-circular duct 49, whereupon suction will be created in said duct which will cause the blank which is presented thereto to grip against outlets 45, but it will be seen that this gripping action will not be effective before duct 43 reaches the vertical. However, when duct 43 has traversed 180 degrees from its top vertical position, as seen in Figure 11, the suction will be cut off by the mouth 47 of the duct passing beyond the duct 49 of collar 48, whereby the blank will be released upon the conveyor 61 of the drier denoted generally by 60, Figure 2. For the purpose of retaining the released blank in alignment upon the conveyor 61, a pair of retaining rolls 62, 62 are provided which engage the upper surface of the same. Preferably the feed of rolls 62 and the conveyor is so timed as to cause the blanks partially to overlap in such a manner as to form a continuous band with the freshly gummed surfaces exposed. In this manner the capacity of the drier is made several times greater than if the blanks were in fully spaced position. An auxiliary endless belt 62a is provided to receive the body of the blanks as they are conveyed by discs 41, and guide them into the drying way.

The drying way 60 comprises the endless belt 61, above mentioned, which passes over suitably disposed pulleys including a drum 63 and also stationary guides 64, 65 upon which it is partially supported. Cooperating with belt 61 are a plurality of belts, viz. a pair of spaced belts 66 (only one of which is seen in Figure 2), passing over pulleys including pulley 67 at the left end of the drier and holding the blanks, belts 69 serving to hold the envelopes upon belt 61 when the latter is going around drum 63, said belts being provided with the requisite pulleys as shown, and finally, an auxiliary pair of belts 71 are provided between the belt 61 and the support 65. By providing separate securing pairs of belts around the periphery of belt 61 certain advantages as to flexibility and accuracy of operation are had and the disturbance of the relative positions of each blank relative to the others prevented.

Figure 9:
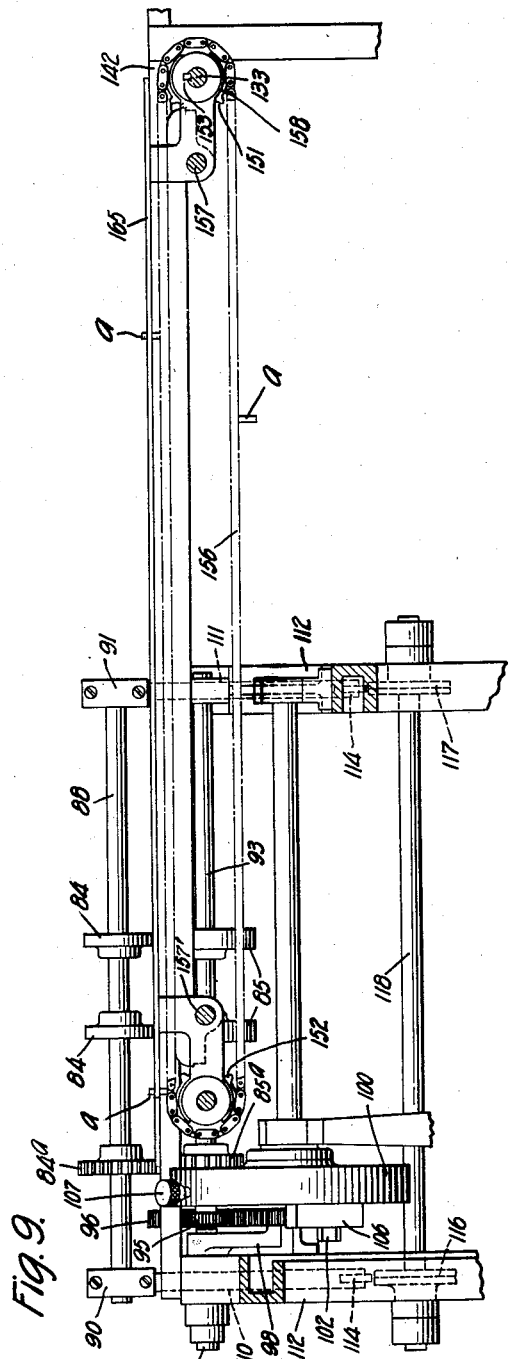
Figure 9 is a sectional side view taken on the line 9—9 of Figure 10.

A feature of the invention has to do with the means for delivering the blanks from the drying way, and for an understanding of such mechanism reference is made to Figures 8, 13 and 14, particularly. The band of overlapping blanks leaves the drier and is fed out onto a traveling band 80 cooperating with which is a pair of feed rolls 82, 82 on either side of the belt, such rolls imparting to the blank upon which they operate an accelerated movement causing the blank to enter the bight of a pair of roll sets 84, 85 (Figures 8 and 9) forming part of a special delivering mechanism. Cooperating with these rolls and with the belt 80 is a curved guide 86 which facilitates the entry of the blanks into the bight of the roll sets 84, 85. It is the function of these rolls to present the blanks one at a time to a conveyor X whose course is at right angles to the previous travel of the blanks whereby the blanks will be accurately positioned on such conveyor. It is important, in other words, that the blanks overlie the inner longitudinal edge of the conveyor a predetermined amount in order that the further folding operations, as indicated in Figures 1 and 7, may be facilitated. To this end, roll sets 84, 85 are caused to feed the blank a predetermined amount in a forward direction whereupon feeding stops and the blank is removed from the rolls in a manner to be described. To accomplish this, the lower rolls 85, 85 are driven first in a forward direction and then reversed. At the instant of reversal, the upper rolls 84, 84 are raised out of contact with the lower rolls 85, 85, thereby releasing the blank and permitting it to be withdrawn sidewise by the action of the conveyor X. When the lower rolls have been rotated to their initial position, the upper rolls are lowered into contact with them again and the operation repeated. In order to carry out these operations, the rolls 84, 84 are mounted on the shaft 88 journaled in blocks 90, 91, said shaft also bearing a gear 84a of the same pitch diameter as the rolls 84, said gear meshing with a gear 85a of a pitch diameter equal to the diameter of the roll 85 which is mounted on the shaft 93 and which bears roll 85. For the purpose of rotating gear 85a, shaft 93 is provided with a pinion 95 which meshes with a rack 96 which is guided in a bracket 98 swingably suspended upon a shaft 94, in alignment with shaft 93, said bracket serving to keep the rack in mesh with the pinion 95. Rack 96 also constitutes a crank which is moved by means of a crank disc 100 through a crank pin 102 carried in a block 103 which is adjustably held in a pair of guides 104 by means of a screw 106 having a handle 107 beyond the periphery of disc 100. It will be seen from the foregoing that by turning the handle 107, the throw of the combined crank and rack 96 may be accurately adjusted and hence the adjustment of the angular travel of feed rolls 84, 85 accomplished.

For the purpose of causing the upper rolls 84 to stand away from the rolls 85, the blocks 90, 91 are carried respectively on rods 110, 111 suitably journaled in the frame 112 and bearing at the ends thereof cam followers 114 (Figures 8 and 9), the latter contacting with cams 116, 117, respectively, secured on a shaft 118, the latter being driven in timed relationship with disc 100 by connections not shown. It will be seen from the foregoing that at the proper times the cams 116, 117 thus cause the shaft 88 bearing the rolls 84 and gear 84a to be elevated up from contact with the rolls 85 and gear 85a respectively, this separation lasting until the lower roll 85 has finished its reversing movement and is about to start forwardly again.

Certain details of the construction of the conveyor X may now be set forth. This conveyor comprises a pair of chains 130, 150, chain 130 passing around sprockets 131, 132, such sprockets being fixedly mounted on shafts 133, 134, respectively. Chains 130, 150 carry pins a which are in alignment with one another and which serve to engage the blank from the rear and convey it through the rest of the machine. For supporting the blank A a table member 140 (see particularly Figures 10 and 14) is provided which extends partially into the bight of rolls 84, 85 and which is attached to brackets 141 fixed to a longitudinal support 142 attached to a leg 143 forming one of a plurality. Cooperating with the member 140 is a table member 145 parallel therewith and separated therefrom a distance sufficient to accommodate pins a, this support also being mounted on support 142. It also rests upon a pair of upstanding supports 148, 148 whose attachments is to be more fully described below. For the purpose of accommodating envelopes larger than the one shown in Figure 10, for example, the cooperating chain 150 is mounted so as to be separated in a transverse direction from chain 131. For this purpose chain 150 is provided with sprockets 152, 152 (Figure 10) slidably mounted, respectively, on shafts 133 and 134 and being splined to shaft 133, for example, by means of a key 153 (Figure 5) in a key way 154. Sprocket 152 is joined to threaded shaft 157 by means of a bracket 155 of bellcrank shape having threaded engagement with shaft 157. Bracket 155 terminates in a fork 158 which engages flanged collar 159 on shaft 133, for example, (see Figures 10 and 14). A similar shaft 157' is provided at the opposite side of the machine for which a similar bracket and attaching means are provided. A cross shaft 160 and bevel gearing 161 and 162 are provided, all seen in Figure 10. Shaft 157' projects from the frame of the machine in a squared portion 163 which may be engaged by a suitable crank whereby shafts 157 and 157' may be given simultaneous rotation to carry out the adjustment of chain 150. Each bracket 155 also has an arm 148, Figure 14, which aids in the support of the table member 145, and also a support 164 for the purpose of carrying table member 165, which preferably is separated from member 145 by an amount just sufficient to accommodate the pins a of chain 150. Thus, when the conveyor X is to be adjusted for different sizes of envelopes, the shaft end 161 will be rotated to separate chains 130 and 150 whereupon it will usually be desirable to provide new table sections 145, 165 of different size so as to give a nearly continuous table surface. For this purpose, the table members are made easily removable by means of screws 166, Figure 14. For the purpose of maintaining the blanks flat against the conveyor X guide bars or wires 170, 171 are preferably provided which are raised a short distance above the conveyor surface so as to permit the blanks to be fed thereunder.

To recapitulate briefly the operation of the machine, the blanks are fed from the stack A and are delivered one at a time to the gummer 18 which supplies gum to the inner side flap of the blank. Thence it passes to the side flap folder 22. The blanks with their side flaps folded then pass successively to the sealing flap gumming device 24 which stamps the gum thereupon. The blanks are then acted upon by the collecting device 40 which forms them into a continuous band, as seen in Figure 1, in which form they pass through the drier 60. Leaving the drier, they pass upwardly on conveyor 80 to the drawing-out rolls 82, 82 by which they are separately fed to arresting and registering station 75, the action of which is to feed out in a positive manner the blanks over the secondary conveyor X and, when this function is accomplished, to release the blank by the withdrawal upwardly of the upper feed roll 84, 84 and allow the blank to be moved sidewise by the pins of the secondary conveyor.

On the secondary conveyor X the blanks are caused to pass the devices that complete the folding. Such devices include first the bottom flap gummer 180 which operates to gum that flap, the curved guides 181, 181 by means of which both the bottom and top flaps are turned, and finally the twisted belts 182, 182 which complete the folding of the top and bottom flaps. The completed envelope is shown about to be conveyed from the machine in Figure 7.

In Figure 15 I have shown diagrammatically a slight modification in which the sealing flaps of the blanks are gummed after the collecting operation and before the drying operation whereby the gum may be applied in a single band as by a gumming device 24'. In this way, the application of the gum to the sealing flaps of the blanks A' is facilitated. The blanks are then separated by the rolls 82.

It will be seen from the foregoing that I have provided a machine in which the gumming and folding of the sealing flap of the blanks is formed in a single machine. Moreover, the gumming and drying of the sealed flaps has been performed at a stage in which the side flaps have been folded whereby the effective size of the blank to be handled in the drying operation may be greatly facilitated. Since envelopes of this type run to large dimensions, this facility in handling is considerable.

I claim:

1. In an envelope making machine, means for holding a stack of blanks, means for feeding the blanks therefrom, means for gumming and folding the side flaps, means for thereafter gumming the sealing flaps, means for drying the latter and means for completing the folding operations including the folding of the gummed sealing flaps.

2. In an envelope making machine, means for holding a stack of blanks, means for feeding same from the stack, means for folding the side flaps, means for gumming the sealing flaps, a drier, means for passing the partially folded blanks therethrough, means for receiving the dried blanks from the drier and means for completing the folding operations.

3. In an envelope making machine, means for holding a stack of blanks, means for feeding same from the stack, means for folding the side flaps, means for gumming the sealing flaps, a drier extending beneath said folding mechanism mentioned, means for passing the partially folded blanks therethrough, means for receiving the dried blanks from the drier and means for completing the folding operations.

4. In an envelope making machine, means for holding a stack of blanks, means for feeding same from the stack, means for folding the side flaps, means for gumming the sealing flaps, a drier, means for collecting said blanks into an overlapping band and delivering same into said drier, means for receiving the dried blanks therefrom and means for completing the folding operations.

5. In an envelope making machine, a main conveyor, a secondary conveyor disposed at right angles thereto, a delivery device for receiving blanks from said main conveyor and centering same on said secondary conveyor comprising a pair of rolls adapted to feed a blank between them, means for rotating same including a gear, a combined rack and crank meshing with said gear, a rotatable crank arm therefor, and means for adjusting the throw of said crank.

6. In an envelope making machine, flap folding means, means for conveying the blanks through and past said folding means, means for collecting the blanks operated upon by said folding means, a conveyor upon which the collected blanks are to be disposed, said collecting means comprising a rotatable drum in the path of the blanks, a suction gripping device carried thereby, means for actuating said suction device to grip the blank presented thereto and to release the blank after the predetermined rotation of the drum whereby said blanks are disposed upon said conveyor second mentioned.

7. In an envelope making machine of the type described, a drying way conveyor comprising an endless band upon which a band of overlapping blanks is adapted to be held, drums at either end of said conveyor and over which said conveyor passes, an endless conveyor above said conveyor first mentioned and extending substantially along the upper stretch of said conveyor first mentioned, a third conveyor extending around the drum at the remote end of the conveyor and a fourth conveyor extending along the under stretch of said first mentioned conveyor, said second, third and fourth conveyors being adapted to press the band of blanks against said first conveyor, each of said conveyors last mentioned being capable of conveying movement independent of each other and of the drying way conveyor.

8. In an envelope making machine, a main conveyor, a secondary conveyor disposed at right angles thereto, a delivery device for receiving blanks from said main conveyor and centering same on said secondary conveyor comprising a pair of rolls adapted to feed a blank between them, means for rotating same including a gear, a combined rack and crank meshing with said gear, a rotatable crank arm therefor, means for adjusting the throw of said crank, and means for driving the pair of said rolls from the lower rolls, means for raising the upper of said rolls from the lower rolls and simultaneously breaking the drive connection.

9. In an envelope making machine, means for holding a stack of blanks, means for feeding the same from the stack, a flap folding mechanism for completing a portion of the folding operations, a drier extending beneath said folding mechanism mentioned, means for receiving the dried blanks from the drier, and means for completing the folding operations.

10. In an envelope making machine, initial blank conveying means, means for folding the longitudinally extending flaps of a blank while on said conveying means, a secondary conveying means operating transversely and continuously with respect to said initial conveying means and adapted to receive the partially folded blanks and move them at right angles to their previous travel, means for seizing successive blanks fed by said initial conveying means and positively feeding them out over the secondary conveying means in the direction of their travel on said initial conveying means whereby to accurately align the blanks upon said secondary conveying means.

11. In an envelope making machine, initial blank conveying means, means for folding the longitudinally extending flaps of a blank while on said conveying means, a secondary conveying means operating transversely and continuously with respect to said initial conveying means and adapted to receive the partially folded blanks and move them at right angles to their previous travel, means for seizing successive blanks fed by said initial conveying means and positively feeding them out over the secondary conveying means in the direction of their travel on said initial conveying means whereby to accurately align the blanks upon said secondary conveying means, and means for releasing the blanks from said feeding and aligning means.

12. In an envelope making machine, initial blank conveying means, means for folding the longitudinally extending flaps of a blank while on said conveying means, a secondary conveying means operating transversely and continuously with respect to said initial conveying means and adapted to receive the partially folded blanks and move them at right angles to their previous travel, mechanism for disposing the blanks in correct register upon said secondary conveying means comprising a pair of rolls adapted to feed the blanks between them out over said secondary conveying means in the direction of travel of said initial conveying means, means for introducing the blanks into the bight of said rolls, means for rotating said rolls a predetermined amount to correctly position the blanks upon said secondary feeding means, and means for releasing the blanks from said rolls.

13. In an envelope making machine, a main conveyor, a secondary conveyor disposed at right angles thereto, a delivery device for receiving blanks from said main conveyor and centering same on said secondary conveyor comprising a pair of rolls adapted to feed a blank between them, means for rotating same, means for releasing the blank from said pair of rolls including means for removing the driving member of said roll pair from contact with the blank.

14. In a machine for making envelopes of the open end type, means for holding a stack of blanks, means for feeding the blanks therefrom with the side flap portions parallel to the direction of travel, means for gumming and folding the side flaps, means for thereafter gumming the sealing flaps, means for drying the latter, and means for completing the folding operations.

15. In an envelope making machine, means for holding a stack of blanks, means for feeding the blanks therefrom, means for gumming and folding the side flaps, means for thereafter gumming the sealing flaps, means for drying the latter and means for completing the folding operations, said means including devices for simultaneously folding both end flaps of the blank.

16. The method of making envelopes which consists in feeding the blanks from a stack with the side flap portions parallel to the direction of travel, gumming and folding the side flaps, then gumming the sealing flap, drying the latter and then completing the folding operations.

ABRAHAM NOVICK.